Dec. 25, 1923.

E. BROWN 1,478,886

ATTACHMENT FOR HARROWS

Filed Nov. 2, 1922

Earl Brown,
INVENTOR

Dec. 25, 1923.

E. BROWN

ATTACHMENT FOR HARROWS

Filed Nov. 2, 1922

Earl Brown.
INVENTOR

BY Victor J. Evans.
ATTORNEY

WITNESS:

Patented Dec. 25, 1923.

1,478,886

UNITED STATES PATENT OFFICE.

EARL BROWN, OF LAUREL, IOWA.

ATTACHMENT FOR HARROWS.

Application filed November 2, 1922. Serial No. 598,597.

*To all whom it may concern:*

Be it known that I, EARL BROWN, a citizen of the United States, residing at Laurel, in the county of Marshall and State of Iowa, have invented new and useful Improvements in Attachments for Harrows, of which the following is a specification.

This invention relates to improvements in attachments for harrows and has for an object the provision of means which may be secured to the draw bars of ordinary harrows, whereby a number of harrows may be easily and quickly connected to provide a relatively wide harrow formed by the separated harrow sections which are capable of being folded upon one another.

Another object of the invention is the provision of novel means for accomplishing the above, which will permit of adjustment of the outer or end harrow draw bar, so as to cause said draw bar to "carry straight."

With the above and other objects in view, the invention further includes the following novel features and details of construction, to be hereinafter more fully described, illustrated in the accompanying drawings and pointed out in the appended claims.

In the drawings:—

Figure 1:
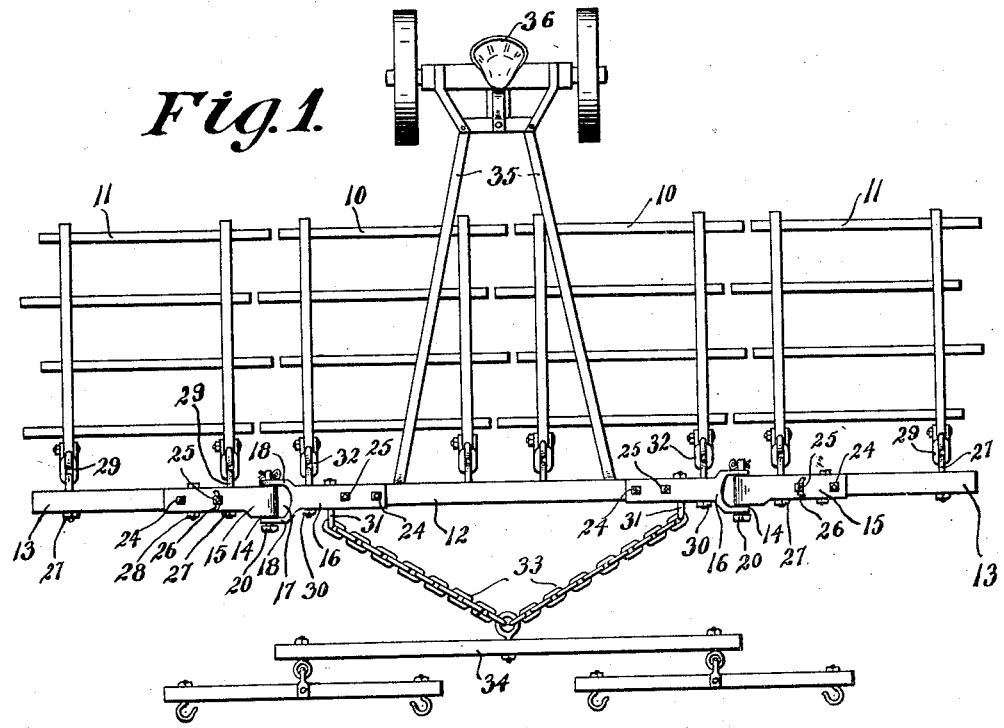
Figure 1 is a plan view showing a plurality of harrows connected by means of the present invention.
Figure 2:
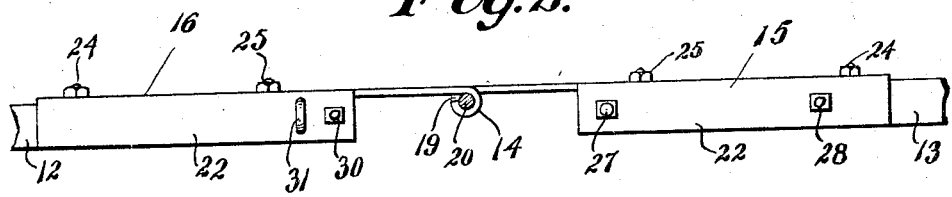
Figure 2 is an enlarged fragmentary front elevation showing the connection between adjacent ends of the harrow draw bars.
Figure 3:
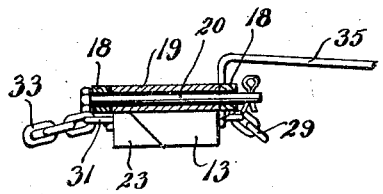
Figure 3 is an enlarged transverse sectional view.
Figure 4:
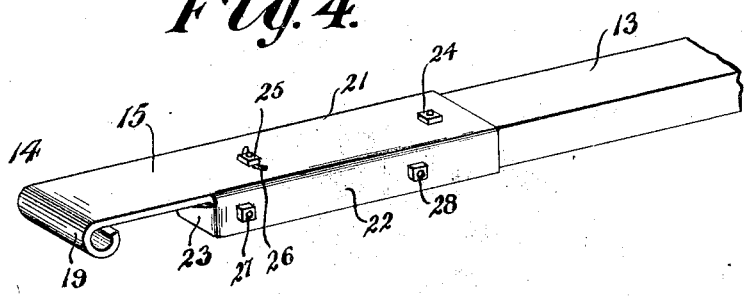
Figure 4 is a detail perspective view of one of the hinged members.
Figure 5:
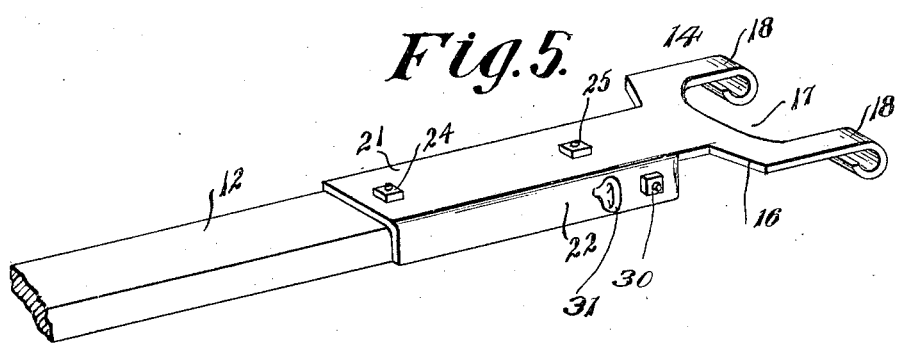
Figure 5 is a similar view of the other hinged member.

Referring in detail to the drawings, wherein like characters of reference denote corresponding parts, the invention is shown as connecting a plurality of harrows together to provide a relatively wide harrow which includes inner sections 10 and outer sections 11, each of which is formed by a separate harrow unit of any preferred construction. The draw bars of the harrow sections 10 and 11 are indicated at 12 and 13 respectively and are connected by means of the present invention, the draw bar 12 of the harrows 10 being formed of a single piece of material so that one draw bar will suffice for both of the inner sections of the harrow.

The connection between the sections 11 and 12 comprises a hinge 14 which is formed of separate plates or leaves 15 and 16, the latter being bifurcated at one end as shown at 17 to provide spaced ears 18. The plate or leaf 15 of the hinge 14 is provided with a transversely arranged sleeve 19, a bolt or pin 20 passing through this sleeve and through the eyes 18 so as to hingedly connect the plates or leaves together.

The plates or leaves 15 and 16 are of substantially the same construction and each includes a top 21 having a flange 22 so as to provide a cross sectionally L-shaped member which is adapted to engage over the draw bars 12 and 13. The flanges 22 are provided at one end with right angularly arranged portions 23, which extend around the ends of the draw bars and act to protect the same.

The plates or leaves 15 and 16 are connected by means of bolts 24 and 25, the bolt 24 of the plate or leaf 15 acting as a pivot bolt, while the bolt 25 of this plate of leaf acts as an adjusting bolt and for this purpose passes through an arcuate slot 26. By this means the draw bar 13 of the outer harrow section 11 may be adjusted to cause the said draw bar to "carry straight."

Extending through the flanges 22 of the plates or leaves 15 and 16 and through the adjacent ends of the draw bars, are bolts 27 and 28, the former being in the form of an eye bolt and provided with a short chain section 29 for attachment to the harrow section 11. The bolt 28 acts as an additional securing means for attaching the plate or leaf 15 to the draw bar 13 and further aids in holding the said draw bar and leaf or plate in proper adjusted position.

The flange 22 of the leaf or plate 16, of the hinge 14 has extending therethrough bolts 30 and 31, the former being in the form of an eye bolt and having a short chain section 32 secured thereto for connection with the inner section 10 of the harrow. The bolt 31 is designed for attachment to a hitch 33, which may be of any suitable type, so that the harrows may be connected with a suitable draft appliance, such as is illustrated at 34. The harrow may have attached thereto by means of rods or chains 35, a suitable riding cart 36 of any type.

The invention is susceptible of various changes in its form, proportions and minor details of construction and the right is herein reserved to make such changes as properly fall within the scope of the appended claims.

Having described the invention what is claimed is:—

1. In a harrow, the combination with harrow sections including separate draft bars, of means for hingedly and adjustably connecting adjacent ends of the draft bars.

2. In a harrow, the combination with harrow sections including separate draft bars, of means for hingedly connecting adjacent ends of the draft bars, said means including transversely L-shaped plates, spaced apertured ears extending from one of the plates, a sleeve extending through the other plate between said ears and receiving a hinged pin and means for securing the plates to the draft bars.

3. In a harrow, the combination with harrow sections including separate draft bars, of hinged members connecting the adjacent ends of the draft bars, means for rigidly securing one of said members in place, a pivot bolt connecting the other member with the adjacent end of one of the bars, said other member having an arcuate slot arranged concentrically with the pivot bolt and a locking bolt extending from the draft bar through the arcuate slot, whereby said other hinged member may be adjustably secured in position.

In testimony whereof I affix my signature.

EARL BROWN.